United States Patent [19]
Burton et al.

[11] Patent Number: 5,801,879
[45] Date of Patent: Sep. 1, 1998

[54] DEVICE AND METHOD TO SUPRESS Q-SWITCHING IN AN OPTICAL AMPLIFYING DEVICE

[75] Inventors: Clement Dowd Burton, Elmira; Douglas Warren Hall, Corning, both of N.Y.

[73] Assignee: Corning Incorporated, Corning, N.Y.

[21] Appl. No.: 878,262

[22] Filed: Jun. 18, 1997

Related U.S. Application Data

[60] Provisional application No. 60/029,382 Oct. 29, 1996.
[51] Int. Cl.$^6$ .................................................. H04B 9/00
[52] U.S. Cl. ............................ 359/341; 359/127; 359/634
[58] Field of Search ........................... 359/114, 124, 359/127, 160, 618, 629, 634

[56] References Cited

U.S. PATENT DOCUMENTS

| | | | |
|---|---|---|---|
| 4,910,727 | 3/1990 | Fussgänger | 370/3 |
| 4,972,513 | 11/1990 | Mochizuki et al. | 455/601 |
| 5,295,011 | 3/1994 | Heise | 359/114 |
| 5,317,660 | 5/1994 | Veith | 385/24 |
| 5,375,010 | 12/1994 | Zervas et al. | 359/341 |
| 5,452,124 | 9/1995 | Baker | 359/341 |

*Primary Examiner*—Mark Hellner
*Attorney, Agent, or Firm*—William Greener, Esq.

[57] ABSTRACT

An improved four-port dichroic WDM, for use in a multiwavelength, bi-directional optical amplifier, having a dichroic filter for substantially reflecting a first wavelength band input to the WDM to an output of the WDM for the first wavelength band and for substantially transmitting a second wavelength band input to the WDM to an output of the WDM for the second wavelength band, in which some of a first 3 dB wavelength in the first wavelength band is transmitted by the filter and some of a second 3 dB wavelength in the second wavelength band is reflected by the filter, includes another dichroic filter having a filter function different than the filter function of the WDM filter providing an insertion loss for the first or the second 3 dB wavelengths sufficient to reflect and transmit, respectively, substantially all of the first and second 3 dB wavelengths. Additional dichroic filters for suppressing 3 dB light are used to prevent Q-switching in an optical gain cavity in a multiwavelength, bi-directional optical amplifier formed by a reflection point in an optical path connected to the amplifier.

14 Claims, 8 Drawing Sheets

5,801,879

1

DEVICE AND METHOD TO SUPRESS Q-SWITCHING IN AN OPTICAL AMPLIFYING DEVICE

This application claims the benefit under 35 USC §119 (e) of U.S. Provisional Application Ser. No. 60/029,382 filed Oct. 29, 1996.

FIELD OF THE INVENTION

The invention generally relates to a multiwavelength, bi-directional optical amplifier incorporating a conventional four-port WDM coupler, and more specifically to an improved four-port WDM coupler, and a method, for suppressing Q-switching in a gain cavity that is set up in the device due to a reflection point along an optical path of the device.

BACKGROUND

Progress in optical signal transmission systems has moved rapidly in recent years due to the development and deployment of all-optical amplifiers, such as erbium doped fiber amplifiers (EDFAs). While the use of such amplifiers has allowed transmission spans between amplifiers to increase, the need for higher bandwidth and data rates, bi-directionality of signal transmission, fewer system components, and better system efficiency has also increased. An example of a system that addresses these concerns is disclosed in U.S. Pat. No. 5,452,124, incorporated herein by reference in its entirety. The '124 patent discloses a device including a four-port dichroic (wavelength-division multiplexing) filter and a single erbium doped optical fiber amplifier to implement a dual wavelength, bi-directional (single fiber) optical amplifier module. FIG. 11 illustrates a four-port WDM filter 1105, the operation of which is fully described in the '124 specification. To briefly summarize, a signal,$\lambda_1$, input to port 1, is directed to port 3 via reflection by the multilayer dielectric filter, as shown in FIG. 12. $\lambda_1$ traverses the fiber link 1110 where it is amplified by EDFA 401 and is further transmitted to port 4 of the four port WDM where it is again reflected by the multilayer dielectric filter to port 2 for transmission along fiber 103. A different signal, $\lambda_2$, propagating in a direction opposite that of $\lambda_1$, enters the four-port WDM at port 2 where it is transmitted to port 3 via transmission through the multilayer dielectric filter. It thereafter follows the same path as $\lambda_1$ through the EDFA via link 1110, and into the WDM at port 4 where it is transmitted to port 1 via transmission through the multilayer dielectric filter and out along transmission fiber 103 in a direction opposite to the direction of $\lambda_1$. Such a device thus allows for at least two different signal channels traveling in opposite directions to be transmitted along a single fiber and to be amplified by a single amplifying device, the benefits of which are obvious to those skilled in the art.

A technology limiting characteristic of a four-port WDM filter such as that disclosed in the '124 patent is that for certain wavelengths traveling the route of $\lambda_1$, for example, the dielectric filter will act as a 3 dB coupler; i.e., instead of reflecting the substantial portion of the light incident at port 1, light at a wavelength hereinafter referred to as the first 3 dB crossover wavelength ($\lambda_{3dB1}$) input to the coupler at port 1 will be split such that half the light will be reflected to port 3 while half the light will be transmitted through the dielectric filter to port 4 where it will exit the WDM. Likewise, there is a second 3 dB crossover wavelength ($\lambda_{3dB2}$) that travels the route of $\lambda_2$ for which the WDM filter, instead of transmitting substantially all of the light through

2 the device as it would for $\lambda_2$, reflects half the light input. This occurs because the filter response of the dichroic filter is not a sharp step function but requires a finite spectral width of several nm to provide reflection and transmission, respectively, for different wavelengths. This is shown in FIG. 3 for reflection and transmission of different wavelengths by the filter. If the optical path to, through and from the device containing the four-port WDM contains a reflection point such as a fiber pigtail connector, for example, and the pigtail is disconnected from the transmission fiber (giving rise to approximately a 14 dB reflection), 3 dB crossover light reflected from the pigtail connector will re-enter the WDM and be transmitted along the same path whence it came. Even if the device is disconnected from the transmission fiber such that no signal wavelength is present for amplification by the amplifying portion of the device, but the pump source is still providing pump energy, the erbium ions in the EDFA may be sufficiently inverted to emit a Q-switched pulse of sufficiently high intensity and short duration to damage other components in the optical path. Q-switching, as used herein, will refer to a light pulse caused by the optical discharge of a highly inverted gain medium. Thus, even a single reflection point in the device may create a gain loop or cavity such that in the presence of pump power, amplified light at a 3 dB crossover wavelength will be reflected and sent back along its input path. Introduction of such a reflection will give rise to a Q-switched pulse having the potential to damage components in the optical path. In light of the foregoing, there is a need for suppressing or eliminating the source of light that may give rise to lasing action, and Q-switched pulses in particular, in a gain cavity formed in an optical path of an optical signal amplifying device.

SUMMARY OF THE INVENTION

Accordingly, the invention is directed to an apparatus and a method providing such features. Embodiments of the invention describe a device and method to suppress the transmission and/or reflection of the respective 3 dB crossover wavelengths associated with a WDM dichroic filter in order to eliminate potential lasing at the 3 dB wavelengths in a cavity formed in the device.

The invention also provides an improved four-port WDM that is particularly suited for use in an optical signal amplifying device or in an optical telecommunications transmission system including an optical signal amplifying device which utilizes a four-port WDM, for suppressing Q-switching in such a device.

The benefits of the invention will easily be recognized when a reflection source, from a disconnected pigtail, for example, creates a loop or cavity in an optical signal amplifying device having the potential for imparting gain to light traversing the cavity, and creating a Q-switched pulse that could damage components in the optical system.

In an embodiment of the invention, a four-port WDM device including a dichroic filter for substantially reflecting a first wavelength band input to the device to an output of the device for the first wavelength band and for substantially transmitting a second wavelength band input to the device to an output of the device for the second wavelength band, wherein some of a first 3 dB wavelength in the first wavelength band is transmitted by the filter and some of a second 3 dB wavelength in the second wavelength band is reflected by the filter, includes a first other dichroic filter having a filter function providing an insertion loss for at least one of the first or second 3 dB wavelengths that is sufficient to reflect substantially all of the first 3 dB wavelength or transmit substantially all of the second 3 dB wavelength, respectively, and thus eliminate a potential source of light that could lase in a cavity formed in an optical path of the device.

In an aspect of this embodiment, the device includes a second other dichroic filter having a filter function that is different than the filter functions of the filter in the WDM and the first other dichroic filter, and which provides an insertion loss for either the first or the second 3 dB wavelength that is not suppressed by the first other filter that is sufficient to reflect or transmit, respectively, substantially all of the 3 dB wavelength light.

In an aspect of these embodiments, the first and second other dichroic filters are notch filters.

Another embodiment of the invention describes a multiwavelength, bi-directional optical signal amplifying device that typically includes an EDFA for amplifying a telecommunications signal input to the EDFA, a first optical fiber link having one end coupled to an input of the EDFA, a second optical fiber link having one end coupled to an output of the EDFA, and a four-port WDM including a dichroic filter for substantially reflecting a first wavelength band input to the WDM to an output of the WDM for the first wavelength band and for substantially transmitting a second wavelength band input to the WDM to an output of the WDM for the second wavelength band, wherein some of a first 3dB wavelength in the first wavelength band is transmitted by the filter and some of a second 3 dB wavelength in the second wavelength band is reflected by the filter, wherein the device includes a first other dichroic filter having a filter function that is different than the filter function of the filter in the WDM, which provides an insertion loss for at least one of the first or the second 3 dB wavelengths that is sufficient to either reflect substantially all of the first 3 dB wavelength light or transmit substantially all of the second 3 dB wavelength light, respectively, the first other filter being located in either the WDM itself, or in an optical path connecting the WDM and the EDFA.

In an aspect of this embodiment, the device also includes a second other dichroic filter having a filter function that is different than the filter functions of the filter in the WDM and the first other filter, which provides an insertion loss for either of the first or the second 3 dB wavelength light not suppressed by the first other filter, and which is sufficient to reflect or transmit, respectively, substantially all of the first or the second 3 dB wavelength light, the second other filter being located in either the WDM itself, or in an optical path connecting the WDM and the EDFA.

Another embodiment of the invention describes a telecommunication transmission/receiving system that incorporates a multiwavelength, bi-directional optical signal amplifying device such as that described above, including the improved four-port WDM disclosed herein.

Another embodiment of the invention describes a single fiber, multiwavelength, bi-directional optical amplifying device that incorporates two four-port WDMs, each of which having associated therewith one or more dichroic filters in addition to the filter typically present in a four-port WDM, which provide increased insertion losses sufficient to suppress undesirable 3 dB light as described above from propagating through the system and being amplified in a cavity formed in an optical path of the device.

In each of the embodiments, the other dichroic filters are typically multilayer optical interference filters which themselves act like four-port couplers because they reflect certain wavelengths of light and transmit other wavelengths of light which can be directed via lenses to input and output ports of the device.

The invention further contemplates a method for suppressing lasing in a gain cavity in a multiwavelength, bi-directional optical amplifying device including a four-port WDM, that is formed by a reflection point in an optical path of the device or a system incorporating the device. The method includes providing one or more dichroic filters having different respective filter functions for suppressing what is referred to herein as reflected and transmitted 3 dB wavelength light, such that the cavity loss is greater than the gain of the cavity at the 3 dB wavelengths.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF A PREFERRED EMBODIMENT OF THE INVENTION

Reference will now be made in detail to the present preferred embodiments of the invention, examples of which are illustrated in the accompanying drawings.

Figure 1:
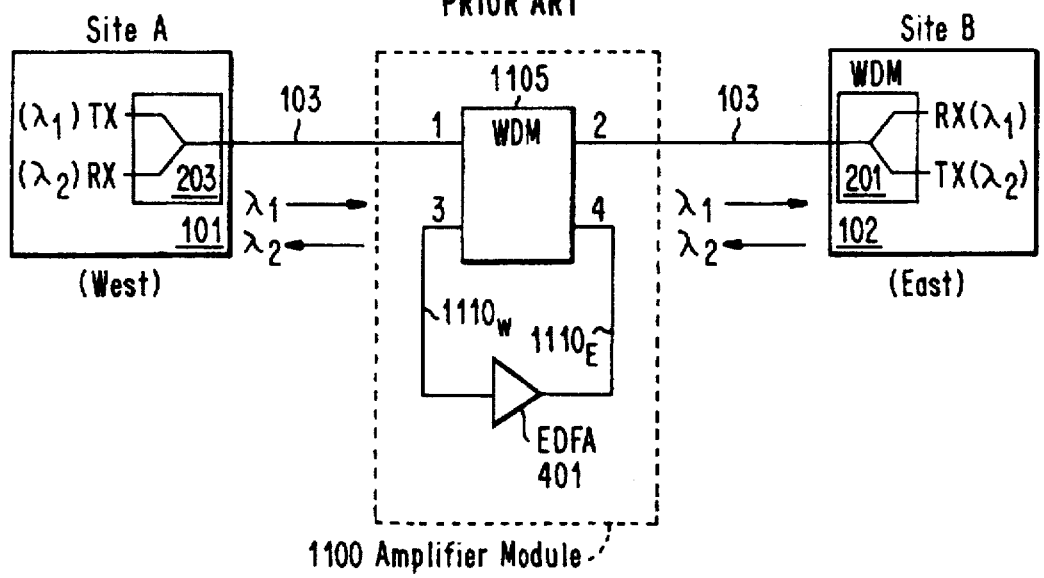
FIG. 1 is a block diagram of a prior art fiber optic communication system including an amplifier module containing an EDFA and a 4-port WDM.

FIG. 1 shows a fiber optic telecommunication system incorporating a single fiber, multiwavelength, bi-directional amplifier module comprising a 4-port WDM filter 1105, east and west optical fiber links $1110_E$ and $1110_w$, and EDFA 401. At site A, a WDM 203 is used to combine two wavelengths of light ($\lambda_1$ and $\lambda_2$) onto a single transmission fiber 103. The transmitter at site A transmits light at wavelength $\lambda_1$ (e.g., red). The receiver at site A receives light from site B at wavelength $\lambda_2$ (e.g., blue). Hence, $\lambda_1$ travels from site A to site B or from west to east on fiber 103, and $\lambda_2$ travels from site B to site A in an east to west direction on the fiber 103.

Incorporated within the amplifier module 1100 is a 4-port WDM filter 1105. Port 1 connects to the west fiber length 103, port 2 connects to the east fiber length 103, port 3 is connected to the input of the EDFA 401 via west optical fiber link $1110_w$ and port 4 is connected to the output of the EDFA 401 via east optical fiber link $1110_E$. Site A's 101 WDM filter 203 is a dichroic filter designed to pass a center wavelength $\lambda_2$. Site B's 102 WDM filter 201 is also a dichroic filter, but is designed to pass a center wavelength $\lambda_1$. The amplifier module's WDM filter 1105 can be constructed from either WDM filter 201 or 203 with the addition of an extra (fourth) port.

Figure 2:
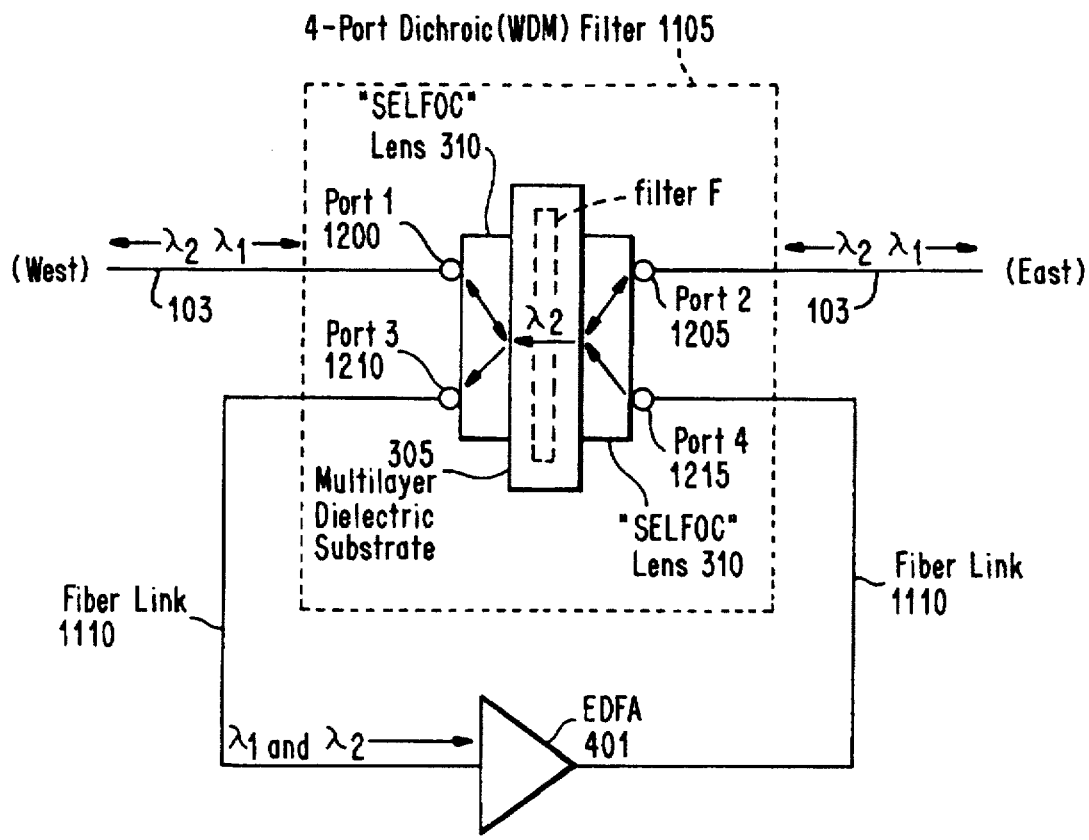
FIG. 2 is an expanded block diagram of the amplifier module of the system shown in FIG. 1.

The functionality of the 4-port WDM filter 1105 can be understood with reference to FIG. 2. West fiber length 103, coming from site A, is connected to port 1 1200. East fiber length 103, coming from site B, is connected to port 2 1205. In the illustrated device, WDM filter 1105 (i.e., the multilayer dielectric substrate 305) has a designated pass through wavelength of $\lambda_2$. This means that signals having a wavelength of $\lambda_2$ will pass through the WDM filter 1105 (from ports 2-3 and 4-1) while signals of other wavelengths will be reflected. Light traveling into port 1 1200 on west fiber 103 having wavelength $\lambda_1$, after being focused onto the filter's substrate by west lens 310, will be reflected by the filter to port 3 1210 (recall that only light having a wavelength of $\lambda_2$ will pass through the filter). In a similar manner, light traveling into port 2 1205 on east fiber 103 having wavelength $\lambda_2$, after being focused onto the filter's substrate by east lens 310, will be passed by the filter, recollimated by west lens 310, and collected at port 3 1210. Hence, port 3 1210 collects light having both wavelengths $\lambda_1$ and $\lambda_2$. Light leaving port 3 is routed via fiber link $1110_w$ to the input port of EDFA 401. In this manner, light traveling from site A to site B as well as light traveling in the opposite direction, from site B to site A, is passed unidirectionally through the EDFA 401.

After amplification, both wavelengths $\lambda_1$ and $\lambda_2$ exit the amplifier 401 and are routed to port 4 1215 where they are focused by the east lens 310 onto the filter's substrate 305. Light of wavelength $\lambda_1$ is reflected back through the east lens into port 2 1205 where it exits the filter on its way to site B. Light of wavelength $\lambda_2$ is passed through the substrate and is focused by the west lens 310 into port 1 1200 where it exits the filter on its way to site A.

The 4-port WDM filter 1105 provides a means to correctly route bidirectional incoming signals so that they pass unidirectionally through a single amplifier, and then are routed in their correct directions for transmission.

Figure 3:
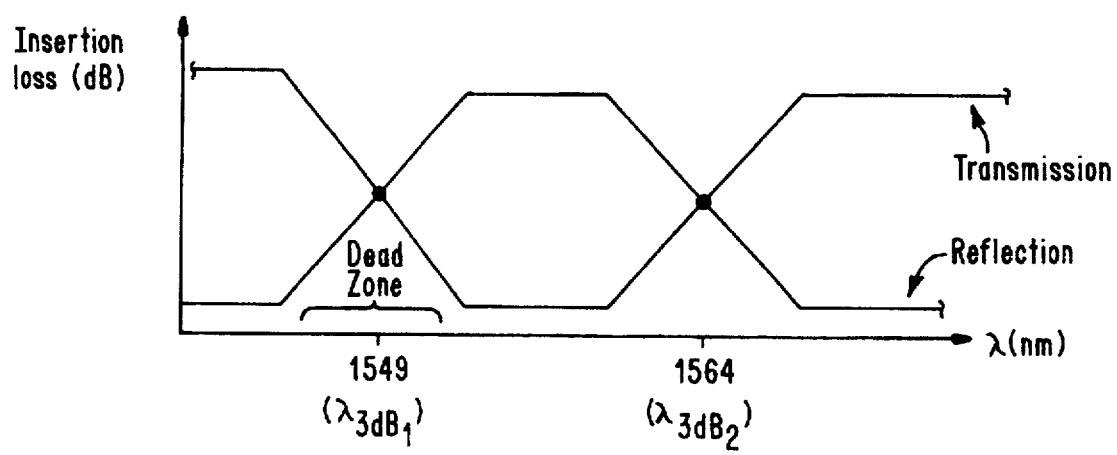
FIG. 3 schematically shows the characteristic reflection and transmission curves of a conventional WDM dielectric filter and the 3 dB wavelengths.

A characteristic of a dichroic filter used in the 4-port WDM is the transmission and/or reflection of certain wavelengths of light by the multilayer dielectric substrate which typically reflects and/or transmits substantially all of the light input to a specified port of the WDM. FIG. 3 schematically shows the actual (vs. ideal) transmission and reflection characteristics of a typical dichroic filter. The transition from reflection to transmission (and vice-versa) for different wavelengths does not occur at a single, discrete wavelength but happens over a wavelength dead zone of about 3–20 nm. There is a wavelength, $\lambda_{3dB1}$ (here, e.g., 1549 nm), associated with the 3 dB transition point for the reflection curve where half of the light (3 dB) is transmitted and half reflected. Likewise, there is a second wavelength, $\lambda_{3dB2}$ (here, e.g., 1564 nm), associated with the 3 dB transition point for the transmission curve where half of the light is transmitted and half reflected. Referring to FIG. 2, the first 3 dB crossover wavelength, $\lambda_{3dB1}$ propagates along fiber 103 in the direction of $\lambda_1$ to port 1. In contrast to the ideal reflection of all of $\lambda_{3dB1}$ to port 3 by the multilayer dielectric filter, half of $\lambda_{3dB1}$ input to port 1 will be reflected to port 3 while half of $\lambda_{3dB1}$ will be transmitted by the multilayer dielectric filter to port 4 where it exits and propagates along east fiber link $1110_E$. In a similar manner, the second 3 dB crossover wavelength, $\lambda_{3dB2}$, is incident on the WDM at port 2. Half of the $\lambda_{3dB2}$ light incident to port 2 will be transmitted by the multilayer dielectric filter to port 3, while half of the $\lambda_{3dB2}$ light input to port 2 will be reflected to port 4 where it will exit WDM and propagate along east fiber link $1110_E$.

Figure 5A:
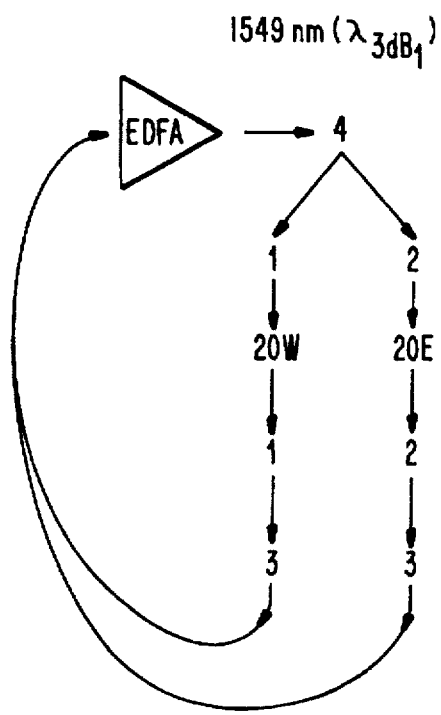
FIG. 5 is a flow chart showing the paths taken by the two exemplary 3 dB wavelengths through the device when a gain cavity is set up therein.
Figure 5B:
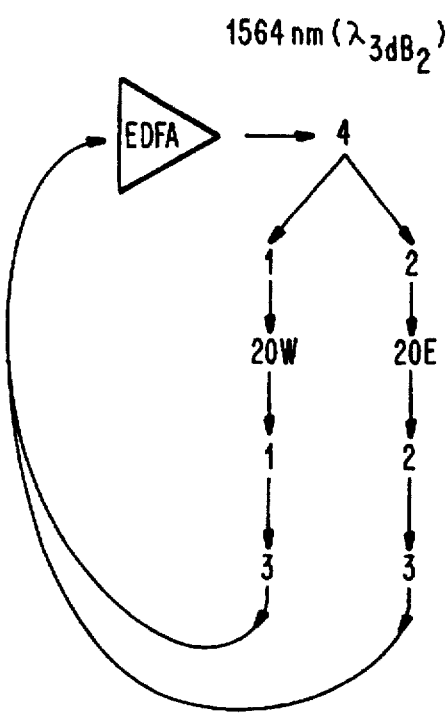
Figure 4:
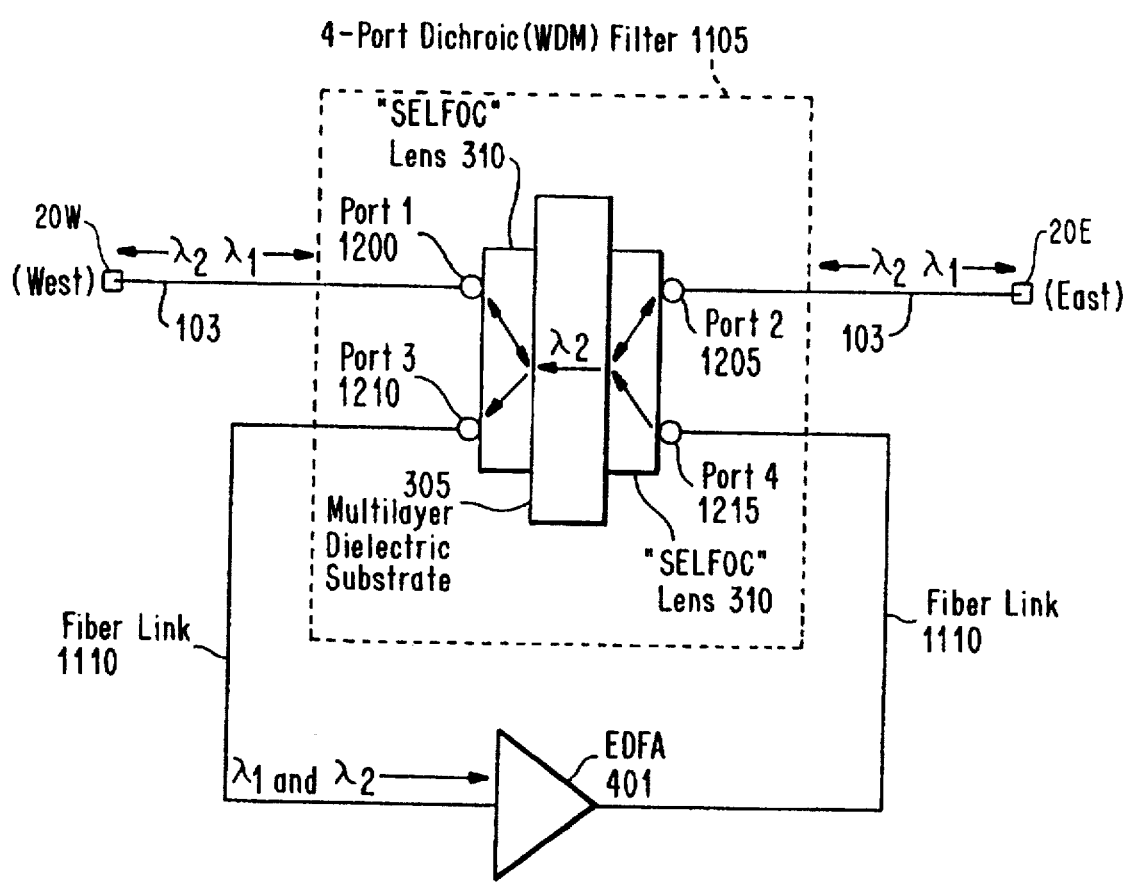
FIG. 4 is a block diagram of an embodiment of the invention, similar to FIG. 2, showing the fiber pigtails and fiber pigtail connectors each representing a potential reflection point when the pigtail is disconnected from the transmission fiber.

As shown in FIG. 4, the amplifier module 1100 will typically be connected to the transmission fibers 103 by pigtail connectors 20E, 20W, coming off of fibers from ports 1 and 2, respectively. A standard fiber pigtail connector, when disconnected, typically has a reflectance of about 14 dB. Even in the absence of a transmission signal, the EDFA will generate broad spectrum ASE in the presence of a pump signal. Since the ASE spectrum includes light at the $\lambda_{3dB1}$ and $\lambda_{3dB2}$ wavelengths, $\lambda_{3dB1}$, for example, will propagate along east fiber link $1110_E$ and enter port 4 of the WDM filter. Because the multilayer dielectric substrate 305 acts as a 3 dB coupler for the 1549 nm 3 dB crossover wavelength light, $\lambda_{3dB1}$, instead of reflecting substantially all of the light to port 2, it reflects only half of the $\lambda_{3dB1}$ light to port 2 whereupon it propagates to east pigtail connector 20E. Connector 20E reflects the $\lambda_{3dB1}$ light back to port 2 where half of the light is transmitted through the multilayer dielectric substrate to port 3, through the EDFA 401, and is ultimately directed to port 1, whereupon it travels along west fiber pigtail 103 to the west fiber connector 20W. The light is reflected from the west fiber connector 20W back to port 1 from where it is reflected by the multilayer dielectric substrate to port 3 and through the EDFA where it is amplified and again propagated along east fiber link $1110_E$ as just described. In addition, the originally generated ASE at 1549 nm that entered port 4 is half reflected by the multilayer dielectric substrate as just described, while half of the light is transmitted through the dielectric substrate and directed to port 1 where it again reflects from west fiber connector 20W and sent back through the device. In a similar manner, ASE emission at 1564 nm generated by the EDFA can enter port 4. Half of $\lambda_{3dB2}$ light will be reflected by the multilayer dielectric substrate to port 2, along east fiber pigtail 103 to east fiber pigtail connector 20E which reflects the light back to port 2, through the dielectric filter substrate to port 3 and back through the EDFA where, after amplification, it enters port 4 and is thereafter directed to port 1 and port 2 to the pigtail fibers 103. Thus one or both of the fiber pigtail connectors act as reflection points to form a cavity including a gain medium in which amplified pulses are generated. As the transmission fiber is being connected/disconnected from the pigtail connectors 20E, 20W, a Q-switched high energy pulse is available to cause damage to components in the optical path. FIG. 5 shows in flow chart form the paths taken by $\lambda_{3dB1}$ and $\lambda_{3dB2}$.

Figure 6:
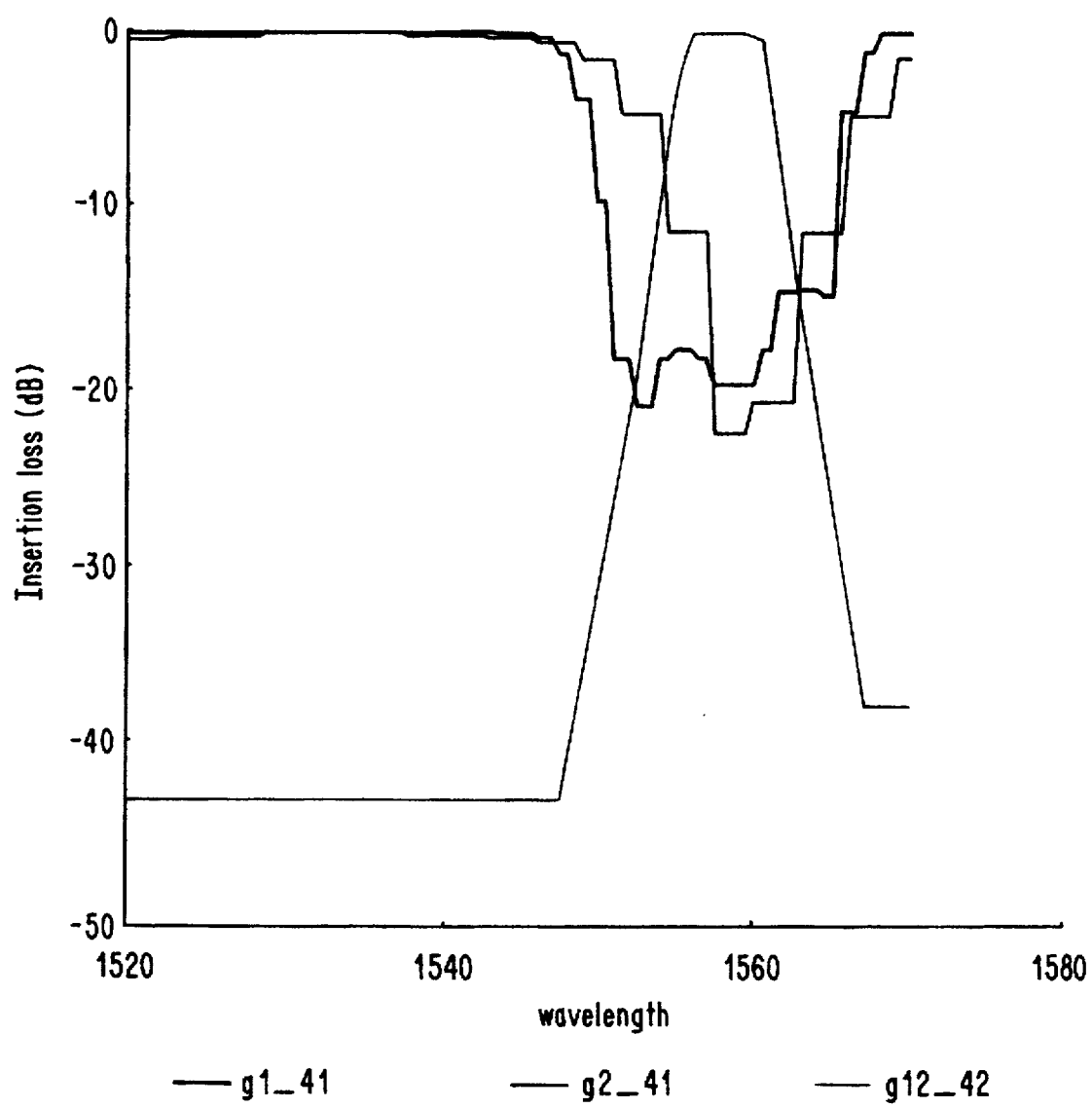
FIG. 6 shows the filter reflection functions of two exemplary filters $F_1$, $F_2$, that have low insertion loss (high reflection) in the blue part of the spectrum and higher insertion loss (lower transmission) in the red part of the spectrum, wherein each filter has different 3 dB filtering points. A corresponding transmission curve is also shown, indicating high transmission insertion loss in the blue part of the spectrum and high transmission between the 3 dB wavelengths of the two filters.
Figure 7:
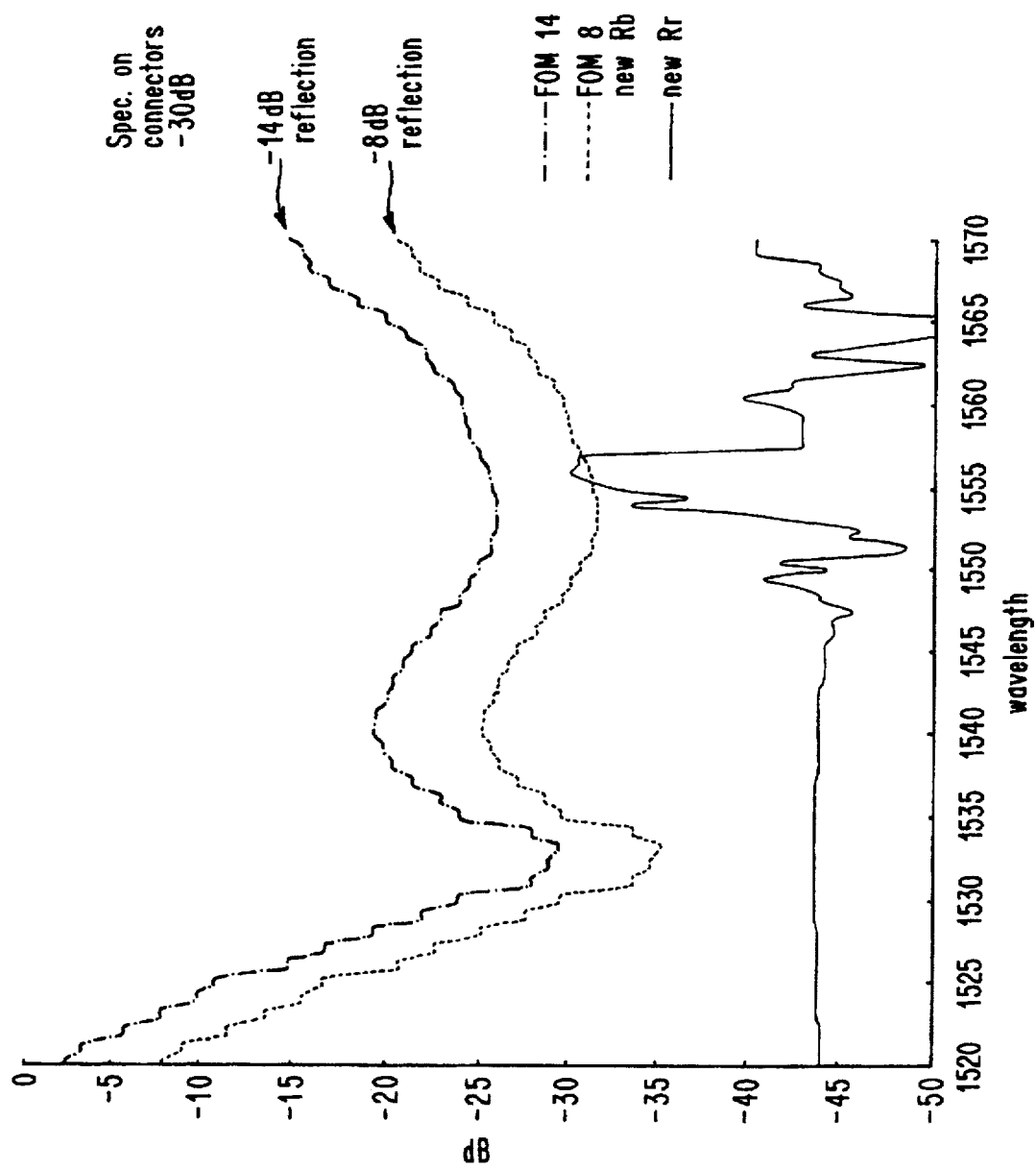
FIG. 7 shows a representative transmission spectrum and two cavity figure of merit (FOM) curves that illustrate that for a strong (−8 dB) reflection the insertion loss is not sufficient to prevent lasing in the cavity, but for a weak (−14 dB) reflection there is adequate suppression.
Figure 8:
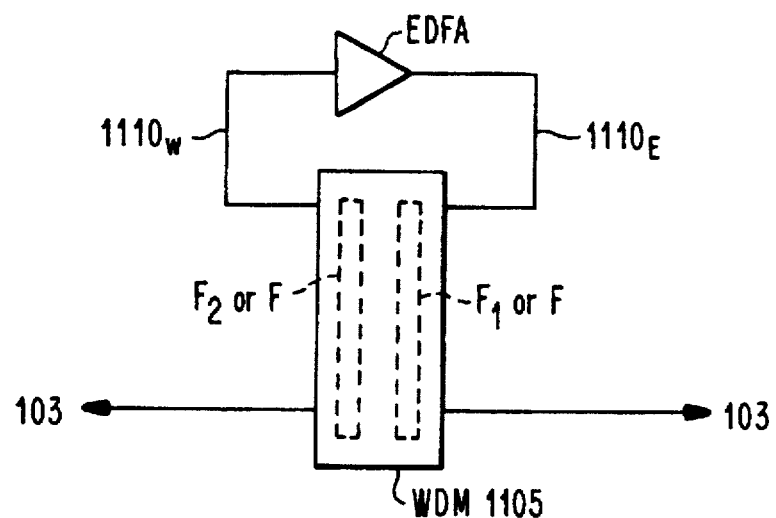
FIG. 8 illustrates an embodiment of the invention which utilizes a single additional filter.

An embodiment of the invention is shown schematically in FIG. 8. In this embodiment, a single additional filter, $F_1$, corresponding to one of the two filters shown, e.g., in FIG. 6, is incorporated into the conventional WDM of the device shown in FIGS. 1 and 2. It will be understood that the conventional device already incorporates a filter, F, having a response function similar to one of the filters shown in FIG. 6, but with different 3 dB points. The additional filter, $F_1$ (or $F_2$) suppresses the 3 dB wavelength that is not suppressed by the existing filter. In this embodiment, the transmission curve will have a broader transmission spectrum than that shown in FIG. 6, which shows a transmission spectrum for an embodiment utilizing two additional filters, described below. It will be further appreciated that although this embodiment and others to be described show additional filters located in the WDM itself, any or all of the additional filters can be incorporated substantially anywhere between the WDM and the EDFA.

Figure 9:
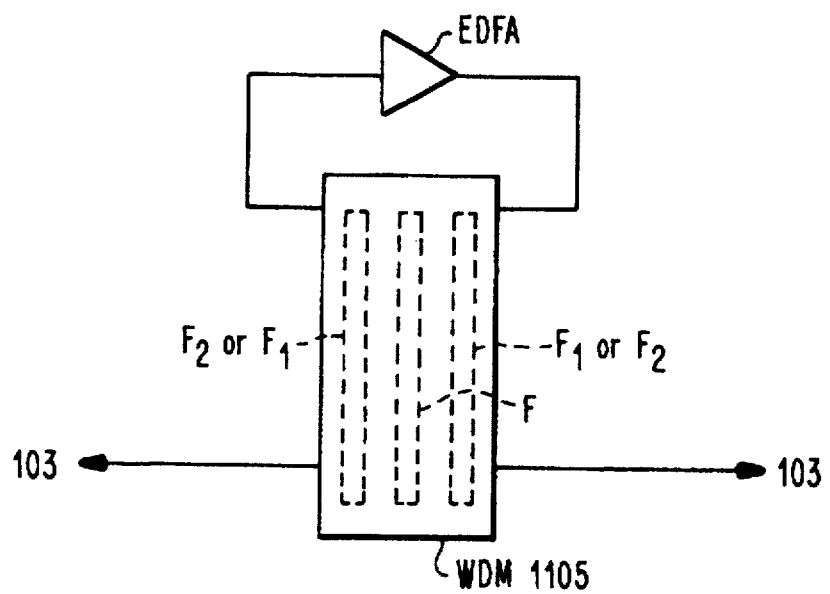
FIG. 9 illustrates an embodiment of the invention which utilizes two additional filters.

Another embodiment is shown schematically in FIG. 9, in which two additional filters (2)$F_1$ or (2)$F_2$ are used in conjunction with the existing filter, F, in the WDM device. This arrangement is preferred over that shown in FIG. 8 because it provides an increased insertion loss for the 3 dB wavelengths that are to be suppressed.

Figure 10:
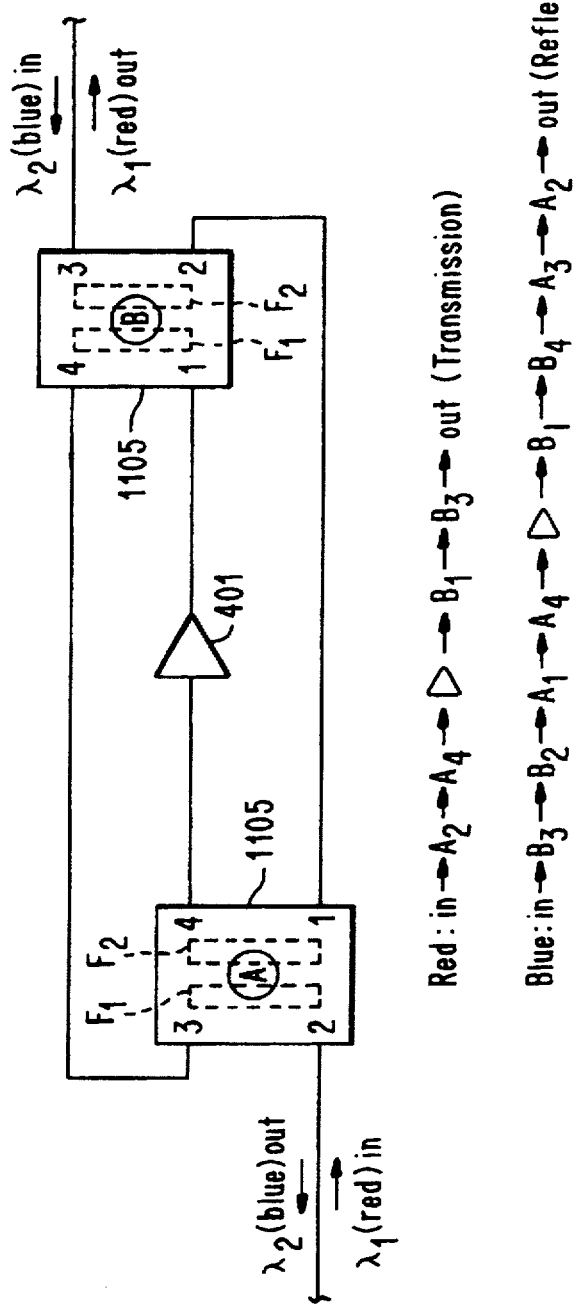
FIG. 10 shows an embodiment of the invention in which two four-port WDM filters are employed to suppress the unwanted 3 dB light.

In a preferred embodiment shown in FIG. 10, the invention comprises the use of two four-port WDMs A and B. Each WDM comprises two filters $F_1$, $F_2$, having filter responses like those shown in FIG. 6. In this embodiment, a $\lambda_1$ signal (e.g., red) is input from the west to WDM port $A_2$. It is transmitted to port $A_4$ and propagates through EDFA 401 whereupon it is input to port $B_1$. From $B_1$, $\lambda_1$ is transmitted through the dielectric filters $F_1$ $F_2$ of WDM B to port $B_3$ and is output in the easterly direction. This is shown by the transmission plot of FIG. 6 which indicated a high transmission insertion loss from about 1520 nm to about 1545 nm (blue spectrum), high transmission between the 3 dB wavelengths of 1549 nm and 1564 nm (red spectrum), and high transmission loss again past about 1565 nm. A $\lambda_2$ signal (e.g., blue) traveling from east to west is input to WDM port $B_3$. It is reflected to port $B_2$ and propagated to port $A_1$ From $A_1$, it is reflected to port $A_4$ and sent through the EDFA and on to port $B_1$. From $B_1$ it is reflected to $B_4$, sent to $A_3$, and reflected to $A_2$ whereupon it is transmitted in the westerly direction. This is illustrated with reference to the reflection curve in FIG. 6 which shows a low reflection insertion loss (high transmission) for the blue spectrum. Thus the anomalous transmission and reflection of the 3 dB wavelengths by the WDM filter is suppressed by the additional filter according to an embodiment of the invention, whereby lasing at the 3 dB wavelengths in a cavity in the device is prevented.

Figure 11:
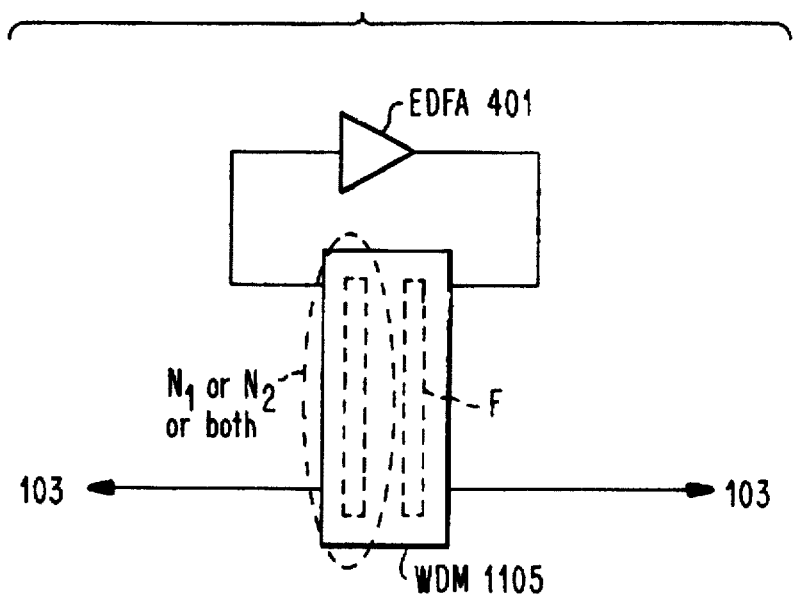
FIG. 11 shows an embodiment of the invention in which the filters are notch filters.
Figure 11:
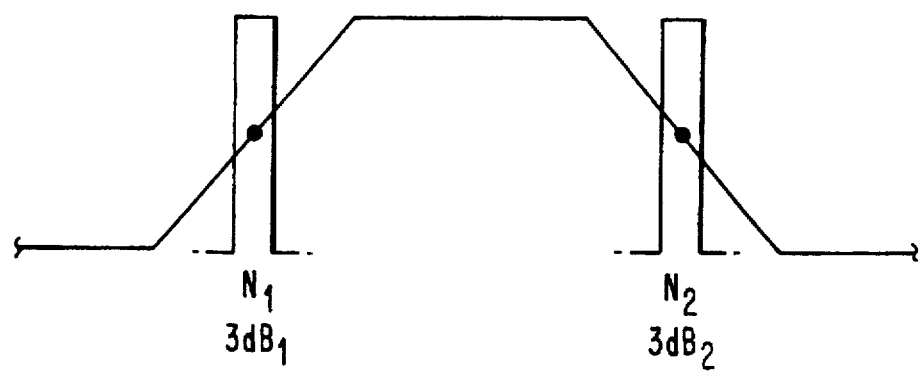

In another embodiment of the invention which describes an improvement over the WDM filter of the prior art, as shown in FIG. 11, a notch filter $N_1$ centered around the first 3 dB wavelength is used in the same manner as $F_1$ or $F_2$ was used as described above. The improvement resides in suppressing one of the two 3 dB wavelengths. In a preferred aspect of this embodiment, a second notch filter $N_2$ is used corresponding to $\lambda_{3dB2}$ such that both 3 dB wavelengths are suppressed.

In each of the embodiments described, the filter means provide an insertion loss for each of the 3 dB crossover wavelengths (1549 nm and 1564 nm) that exceeds the gain of the cavity for the particular 3 dB crossover wavelength formed by a reflection point in the optical path. Filters of the type and design described herein are available, for example, from E-TEK Corp.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:

1. A four-port WDM device including a dichroic filter for substantially reflecting a first wavelength band input to the device to an output of the device for said first wavelength band and for substantially transmitting a second wavelength band input to the device to an output of the device for the second wavelength band, wherein some of a first 3 dB wavelength in the first wavelength band is transmitted by said filter and some of a second 3 dB wavelength in the second wavelength band is reflected by said filter, comprising:

a first other dichroic filter having a filter function providing an insertion loss for at least one of the first and the second 3 dB wavelengths sufficient to reflect and transmit, respectively, substantially all of the first and second 3 dB wavelengths.

2. The device of claim 1 further comprising a second other dichroic filter having a filter function providing an insertion loss for the other of the first and the second 3 dB wavelengths sufficient to reflect and transmit, respectively, substantially all of the other of the first and second 3 dB wavelengths.

3. The device of claim 2 wherein at least one of the first and second other dichroic filters are notch filters providing an insertion loss for at least one of the 3 dB wavelengths, respectively.

4. The device of claim 1 wherein the first wavelength band is from about 1520 nm to 1550 nm and the second wavelength band is from about 1550 nm to 1570 nm.

5. A multiwavelength, bidirectional optical signal amplifying device including (a) an EDFA for amplifying a telecommunications signal input to the EDFA, (b) a first optical fiber link having one end coupled to an input of the EDFA, (c) a second optical fiber link having one end coupled to an output of the EDFA, and (d) a four-port WDM including a dichroic filter for substantially reflecting a first wavelength band input to the WDM to an output of the WDM for said first wavelength band and for substantially transmitting a second wavelength band input to the WDM to an output of the WDM for the second wavelength band, wherein some of a first 3 dB wavelength in the first wavelength band is transmitted by said filter and some of a second 3 dB wavelength in the second wavelength band is reflected by said filter, comprising:

a first other dichroic filter having a filter function providing an insertion loss for at least one of the first and the second 3 dB wavelengths sufficient to reflect and transmit, respectively, substantially all of the first and second 3 dB wavelengths, located in one of said WDM, said first optical fiber link and said second optical fiber link.

6. The device of claim 5 further comprising a second other dichroic filter having a filter function providing an insertion loss for the other of the first and the second 3 dB wavelengths sufficient to reflect and transmit, respectively, substantially all of the other of the first and second 3 dB wavelengths, located in one of said WDM, said first optical fiber link and said second optical fiber link.

7. The device of claim 6 wherein at least one of the first and second other dichroic filters are notch filters providing an insertion loss for at least one of the 3 dB wavelengths, respectively.

8. The device of claim 5 wherein a second other dichroic filter having a filter function providing an insertion loss for the other of the first and the second 3 dB wavelengths sufficient to reflect and transmit, respectively, substantially all of the other of the first and second 3 dB wavelengths, is located in said WDM, and further comprising a second four-port WDM including a dichroic filter for substantially reflecting the first wavelength band input to the second WDM to an output of the second WDM for said first wavelength band and for substantially transmitting the second wavelength band input to the second WDM to an output of the second WDM for the second wavelength band, wherein some of the first 3 dB wavelength in the first wavelength band is transmitted by said filter and some of the second 3 dB wavelength in the second wavelength band is reflected by said filter, wherein the second WDM comprises a first other dichroic filter having a filter function providing an insertion loss for at least one of the first and the second 3 dB wavelengths sufficient to reflect and transmit, respectively, substantially all of the first and second 3 dB wavelengths.

9. The device of claim 8 wherein at least one of the other dichroic filters are notch filters providing an insertion loss for at least one of the 3 dB wavelengths, respectively.

10. The device of claim 6 further comprising a second four-port WDM including a dichroic filter for substantially reflecting the first wavelength band input to the second WDM to an output of the second WDM for said first wavelength band and for substantially transmitting the second wavelength band input to the second WDM to an output of the second WDM for the second wavelength band, wherein some of the first 3 dB wavelength in the first wavelength band is transmitted by said filter and some of the second 3 dB wavelength in the second wavelength band is reflected by said filter, and a second other dichroic filter having a filter function providing an insertion loss for at least one of the first and the second 3 dB wavelengths sufficient to reflect and transmit, respectively, substantially all of the first and second 3 dB wavelengths, located in an optical fiber link connected to said first WDM and to said EDFA.

11. The device of claim 10 wherein at least one of the other dichroic filters are notch filters providing an insertion loss for at least one of the 3 dB wavelengths, respectively.

12. A method for suppressing lasing in a cavity having gain, said cavity arising from a reflection in a bi-directional optical signal amplifying device including an EDFA connected to a four-port WDM including a dichroic filter for substantially reflecting a first wavelength band input to the WDM to an output of the WDM for said first wavelength band and for substantially transmitting a second wavelength band input to the WDM to an output of the WDM for the second wavelength band, wherein some of a first 3 dB wavelength in the first wavelength band is transmitted by said filter and some of a second 3 dB wavelength in the second wavelength band is reflected by said filter, comprising the step of:

providing a first other filter in one of the WDM and an optical path connecting said WDM and said EDFA having a filter function different than a filter function associated with the dichroic filter providing an insertion loss sufficient to reflect and transmit, respectively, substantially all of the first and second 3 dB wavelengths.

13. The method of claim 12 further comprising providing a second other filter in one of the WDM and an optical path connecting said WDM and said EDFA having a filter function different than a filter function associated with either the dichroic filter or the first other filter providing an insertion loss sufficient to reflect and transmit, respectively, substantially all of the first and second 3 dB wavelengths.

14. The method of claim 13 further comprising providing a second WDM including a dichroic filter for substantially reflecting the first wavelength band input to the second WDM to an output of the second WDM for said first wavelength band and for substantially transmitting the second wavelength band input to the second WDM to an output of the second WDM for the second wavelength band, wherein some of the first 3 dB wavelength in the first wavelength band is transmitted by said filter and some of the second 3 dB wavelength in the second wavelength band is reflected by said filter; and providing a second other filter in one of the second WDM and an optical path connecting said second WDM, said WDM and said EDFA, having a filter function different than a filter function associated with the dichroic filter and the first other filter providing an insertion loss sufficient to reflect and transmit, respectively, substantially all of the first and second 3 dB wavelengths.

* * * * *